(12) United States Patent
Lauridsen et al.

(10) Patent No.: US 12,538,196 B2
(45) Date of Patent: Jan. 27, 2026

(54) MEASUREMENT TRIGGERING FOR NETWORKS WITH MOVING NETWORK NODES

(71) Applicant: Nokia Technologies Oy, Espoo (FI)

(72) Inventors: Mads Lauridsen, Aalborg (DK); Jeroen Wigard, Aalborg (DK); Enric Martinez, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 314 days.

(21) Appl. No.: 18/552,819

(22) PCT Filed: Mar. 29, 2021

(86) PCT No.: PCT/EP2021/058136
§ 371 (c)(1),
(2) Date: Sep. 27, 2023

(87) PCT Pub. No.: WO2022/207066
PCT Pub. Date: Oct. 6, 2022

(65) Prior Publication Data
US 2024/0172078 A1 May 23, 2024

(51) Int. Cl.
*H04W 36/00* (2009.01)
*H04W 36/32* (2009.01)
*H04W 84/06* (2009.01)

(52) U.S. Cl.
CPC .... *H04W 36/00837* (2018.08); *H04W 36/322* (2023.05); *H04W 36/324* (2023.05); *H04W 84/06* (2013.01)

(58) Field of Classification Search
CPC ......... H04W 36/00837; H04W 36/322; H04W 36/324; H04W 84/06; H04W 36/0085
See application file for complete search history.

(56) References Cited

U.S. PATENT DOCUMENTS

| | | | |
|---|---|---|---|
| 2023/0397032 A1* | 12/2023 | Yavuz | H04W 36/322 |
| 2024/0292468 A1* | 8/2024 | Xu | H04B 7/18563 |
| 2025/0266902 A1* | 8/2025 | Klatt | H04B 7/18558 |

FOREIGN PATENT DOCUMENTS

| | | | | |
|---|---|---|---|---|
| CN | 119316901 A | * | 1/2025 | ............ H04W 36/32 |
| CN | 119631479 A | * | 3/2025 | .......... H04W 36/322 |
| EP | 4270817 A1 | * | 11/2023 | ............ H04W 8/183 |

(Continued)

*Primary Examiner* — Charles T Shedrick
(74) *Attorney, Agent, or Firm* — Carter, DeLuca & Farrell LLP (57) ABSTRACT

Various example embodiments relate to a solution for modifying mobility events by making them depend on information which captures a moving cell direction. An apparatus may obtain location information associated with at least one moving neighboring cell. The apparatus may determine, based on the location information, a distance change associated with the at least one moving neighboring cell with respect to a user node location. The apparatus may determine an offset for the at least one moving neighboring cell based on the distance change associated with the at least one moving neighboring cell. The apparatus may apply the offset associated with the at least one moving neighboring cell in a mobility event associated with the at least one moving neighboring cell. Apparatuses, methods, and computer programs are disclosed.

16 Claims, 4 Drawing Sheets

(56) References Cited

FOREIGN PATENT DOCUMENTS

| WO | WO-2009117667 A1 | * | 9/2009 | ......... H04W 36/0072 |
| WO | WO-2022084960 A1 | * | 4/2022 | ........... H04W 36/322 |
| WO | WO-2022207066 A1 | * | 10/2022 | ....... H04W 36/00837 |
| WO | WO-2023191596 A1 | * | 10/2023 | ......... H04B 7/18515 |

* cited by examiner

MEASUREMENT TRIGGERING FOR NETWORKS WITH MOVING NETWORK NODES

RELATED APPLICATION

This application was originally filed as PCT Application No. PCT/EP2021/058136, filed on Mar. 29, 2021, of which is incorporated herein by reference in its entirety.

TECHNICAL FIELD

Various example embodiments generally relate to the field of wireless communications. In particular, some example embodiments relate to determining measurement triggering for networks with moving network nodes.

BACKGROUND

Various wireless communication systems, for example 3GPP 5G new radio (NR), may provide non-terrestrial network support, for example, by including base stations in satellites or routing base station signals through satellites. Each satellite may provide NR service on Earth through one or more satellite beams and NR cells. Two different cell types associated with the satellites may be considered, Earth-fixed cells (EFC) and Earth-moving cells (EMC). The former entails that the satellite may continuously adjust the satellite beam pointing direction to fix the NR cell and NR beam to a specific point on Earth, while the latter entails that the satellite beam pointing direction is fixed and thus the beam footprint (i.e. NR cell) is moving on Earth.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments enable a modification of mobility events by making them depend on information which captures a moving cell direction. Further implementation forms are provided in the dependent claims, the description, and the drawings.

According to a first aspect, an apparatus may comprise means for obtaining location information associated with at least one moving neighboring cell; means for determining, based on the location information, a distance change associated with the at least one moving neighboring cell with respect to a user node location; means for determining an offset for the at least one moving neighboring cell based on the distance change associated with the at least one moving neighboring cell; and means for applying the offset associated with the at least one moving neighboring cell in a mobility event associated with the at least one moving neighboring cell.

According to an example embodiment of the first aspect, the apparatus may comprise means for obtaining location information associated with a serving cell; means for determining, based on the location information associated with the serving cell, a distance change associated with the serving cell relative to the user node; and means for determining the offset for the at least one moving neighboring based on the distance change associated with the at least one moving neighboring cell and the distance change associated with the serving cell relative to the user node.

According to an example embodiment of the first aspect, the apparatus may comprise means for determining the offset for the at least one moving neighboring cell based on a ratio between a difference between the distance change associated with the serving cell relative to the user node and the distance change associated with the respective moving neighboring cell, and the distance change associated with the serving cell relative to the user node.

According to an example embodiment of the first aspect, the apparatus may comprise means for determining the offset for the at least one moving neighboring cell based on a ratio of the distance change associated with the at least one moving neighboring cell and the distance change associated with the serving cell relative to the user node.

According to an example embodiment of the first aspect, the apparatus may comprise means for obtaining a mapping table associated with the at least one moving neighboring cell, the mapping table comprising at least one association, each association defining an association between an offset and a distance change associated with the moving neighboring cell; and means for determining the offset for the at least one moving neighboring cell based on mapping table.

According to an example embodiment of the first aspect, the apparatus may comprise means for obtaining location information associated with a serving cell; means for determining, based on the location information associated with the serving cell, a distance change associated with the serving cell relative to the user node; means for obtaining a mapping table associated with the at least one moving neighboring cell, the mapping table comprising at least one association, each association defining an association between an offset and a function of the distance change associated with the moving neighboring cell and the distance change associated with the serving cell; and means for determining the offset for the at least one moving neighboring cell based on mapping table.

According to an example embodiment of the first aspect, the apparatus may comprise means for obtaining a distance scaling factor associated with the at least one moving neighboring cell; and means for scaling the offset associated with the at least one moving neighboring cell with the distance scaling factor.

According to an example embodiment of the first aspect, the at least one moving neighboring cell may be provided by at least one satellite.

According to an example embodiment of the first aspect, the apparatus may comprise means for determining that a moving neighboring cell is provided via a different satellite than the serving cell; and means for applying an additional scaling factor for the offset when the moving neighboring cell is provided via a different satellite than the serving cell.

According to an example embodiment of the first aspect, the apparatus may comprise means for determining that a moving neighboring cell is provided via a different satellite than the serving cell; and means for adding an additional offset to the offset when the moving neighboring cell is provided via a different satellite than the serving cell.

According to an example embodiment of the first aspect, the apparatus may comprise means for obtaining a minimum threshold for the offset; and means for limiting the offset based on the minimum threshold for the offset, when applying the offset in the mobility event.

According to an example embodiment of the first aspect, the apparatus may comprise means for obtaining a maximum threshold for the offset; and means for limiting the offset based on the maximum threshold for the offset, when applying the offset in the mobility event.

According to an example embodiment of the first aspect, the location information associated with the at least one moving neighboring cell comprises a static cell center location value of the at least one moving neighboring cell, a static cell center location value of the at least one moving neighboring cell and a movement vector, or a static cell center location value of the at least one moving neighboring cell and information relating to a satellite ephemeris.

According to a second aspect, an apparatus may comprise means for causing transmission of location information associated with at least moving neighboring cell to at least one user node; means for configuring the at least one user node to determine an offset for the at least one moving neighboring cell based on a distance change associated with the at least one moving neighboring cell with respect to a user node location, the distance change determined based on the location information associated with at least one moving neighboring cell; and means for configuring the at least one user node to apply the offset in a mobility event associated with the at least one moving neighboring cell.

According to an example embodiment of the second aspect, the apparatus may comprise means for causing transmission of a distance scaling factor associated with the at least one moving neighboring cell, the distance scaling factor being used by the user node to scale the offset.

According to an example embodiment of the second aspect, the apparatus may comprise means for causing transmission of a mapping table associated with the at least one moving neighboring cell, the mapping table associated with a moving neighboring cell comprising at least one association, each association defining an association between an offset and at least one distance change value, the mapping table enabling the user node to determine the offset for the at least one moving neighboring cell.

According to a third aspect, a method may comprise obtaining location information associated with at least one moving neighboring cell; determining, based on the location information, a distance change associated with the at least one moving neighboring cell with respect to a user node location; determining an offset for the at least one moving neighboring cell based on the distance change associated with the at least one moving neighboring cell; and applying the offset associated with the at least one moving neighboring cell in a mobility event associated with the at least one moving neighboring cell.

According to an example embodiment of the third aspect, the method may comprise means for obtaining location information associated with a serving cell; means for determining, based on the location information associated with the serving cell, a distance change associated with the serving cell relative to the user node; and means for determining the offset for the at least one moving neighboring cell based on the distance change associated with the at least one moving neighboring cell and the distance change associated with the serving cell relative to the user node.

According to an example embodiment of the third aspect, the method may comprise determining the offset for the at least one moving neighboring cell based on a ratio between a difference between the distance change associated with the serving cell relative to the user node and the distance change associated with the respective moving neighboring cell, and the distance change associated with the serving cell relative to the user node.

According to an example embodiment of the third aspect, the method may comprise determining the offset for the at least one moving neighboring cell based on a ratio of the distance change associated with the at least one moving neighboring cell and the distance change associated with the serving cell relative to the user node.

According to an example embodiment of the third aspect, the method may comprise obtaining a mapping table associated with the at least one moving neighboring cell, the mapping table comprising at least one association, each association defining an association between an offset and a distance change associated with a moving neighboring cell; and determining the offset for the at least one moving neighboring cell based on mapping table.

According to an example embodiment of the third aspect, the method may comprise obtaining location information associated with a serving cell; determining, based on the location information associated with the serving cell, a distance change associated with the serving cell relative to the user node; obtaining a mapping table associated with the at least one moving neighboring cell, the mapping table comprising at least one association, each association defining an association between an offset and a function of the distance change associated with the moving neighboring cell and the distance change associated with the serving cell; and determining the offset for the at least one moving neighboring cell based on mapping table.

According to an example embodiment of the third aspect, the method may comprise obtaining a distance scaling factor associated with the at least one moving neighboring cell; and scaling the offset associated with the at least one moving neighboring cell with the distance scaling factor.

According to an example embodiment of the third aspect, the at least one moving neighboring cell may be provided by at least one satellite.

According to an example embodiment of the third aspect, the method may comprise determining that a moving neighboring cell is provided via a different satellite than the serving cell; and applying an additional scaling factor for the offset when the moving neighboring cell is provided via a different satellite than the serving cell.

According to an example embodiment of the third aspect, the method may comprise determining that a moving neighboring cell is provided via a different satellite than the serving cell; and adding an additional offset to the offset when the moving neighboring cell is provided via a different satellite than the serving cell.

According to an example embodiment of the third aspect, the method may comprise obtaining a minimum threshold for the offset; and limiting the offset based on the minimum threshold for the offset, when applying the offset in the mobility event.

According to an example embodiment of the third aspect, the method may comprise obtaining a maximum threshold for the offset; and limiting the offset based on the maximum threshold for the offset, when applying the offset in the mobility event.

According to an example embodiment of the third aspect, the location information associated with the at least one moving neighboring cell comprises a static cell center location value of the at least one moving neighboring cell, a static cell center location value of the at least one moving neighboring cell and a movement vector, or a static cell center location value of the at least one moving neighboring cell and information relating to a satellite ephemeris.

According to a fourth aspect, a method may comprise causing transmission of location information associated with at least one moving neighboring cell to at least one user node; configuring the at least one user node to determine an offset for the at least one moving neighboring cell based on a distance change associated with the at least one moving neighboring cell with respect to a user node location, the distance change determined based on the location information associated with at least one moving neighboring cell; and configuring the at least one user node to apply the offset in a mobility event associated with the at least one moving neighboring cell.

According to an example embodiment of the fourth aspect, the method may comprise causing transmission of a distance scaling factor associated with the at least one moving neighboring cell to the at least one user node, the distance scaling factor being used by the user node to scale the offset.

According to an example embodiment of the fourth aspect, the method may comprise causing transmission of a mapping table associated with the at least one moving neighboring cell to the at least one user node, the mapping table associated with a moving neighboring cell comprising at least one association, each association defining an association between an offset and at least one distance change value, the mapping table enabling the user node to determine the offset for the at least one moving neighboring cell.

According to a fifth aspect, a computer program may comprise instructions for causing an apparatus to perform at least the following: obtaining location information associated with at least one moving neighboring cell; determining, based on the location information, a distance change associated with the at least one moving neighboring cell with respect to a user node location; determining an offset for the at least one moving neighboring cell based on the distance change associated with the at least one moving neighboring cell; and applying the offset associated with the at least one moving neighboring cell in a mobility event associated with the at least one moving neighboring cell.

According to a sixth aspect, a computer program may comprise instructions for causing an apparatus to perform at least the following: causing transmission of location information associated with at least one moving neighboring cell to at least one user node; configuring the at least one user node to determine an offset for the at least one moving neighboring cell based on a distance change associated with the at least one moving neighboring cell with respect to a user node location, the distance change determined based on the location information associated with at least one moving neighboring cell; and configuring the at least one user node to apply the offset in a mobility event associated with the at least one moving neighboring cell.

According to a seventh aspect, an apparatus may comprise at least one processor and at least one memory including computer program code, the at least one memory and the computer code configured to, with the at least one processor, cause the apparatus at least to perform: obtaining location information associated with at least one moving neighboring cell; determining, based on the location information, a distance change associated with the at least one moving neighboring cell with respect to a user node location; determining an offset for the at least one moving neighboring cell based on the distance change associated with the at least one moving neighboring cell; and applying the offset associated with the at least one moving neighboring cell in a mobility event associated with the at least one moving neighboring cell.

According to an eighth aspect, an apparatus may comprise at least one processor and at least one memory including computer program code, the at least one memory and the computer code configured to, with the at least one processor, cause the apparatus at least to perform: causing transmission of location information associated with at least one moving neighboring cell to at least one user node; configuring the at least one user node to determine an offset for the at least one moving neighboring cell based on a distance change associated with the at least one moving neighboring cell with respect to a user node location, the distance change determined based on the location information associated with at least one moving neighboring cell; and configuring the at least one user node to apply the offset in a mobility event associated with the at least one moving neighboring cell.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Devices, such as for example user equipment (UE), may be enabled to access services through a terrestrial network (TN). In addition, devices may be enabled to access services over a non-terrestrial network (NTN) provided by satellites. For example, terrestrial cellular networks, for example, networks based on 5G NR standards, may be configured to support non-terrestrial networks. UEs supporting NTN may have positioning capability, for example by means of GNSS. In one example of an NTN system, 5G base stations (gNB)

may be deployed onboard satellites, or the gNB signals may be relayed via the satellite(s), to provide communication coverage over a very large area that may be otherwise unreachable by cellular networks. Non-terrestrial networks may be used, for example, to connect internet-of-things (IOT) devices globally as well as to provide personal communication in remote areas and in disaster relief.

Figure 1:
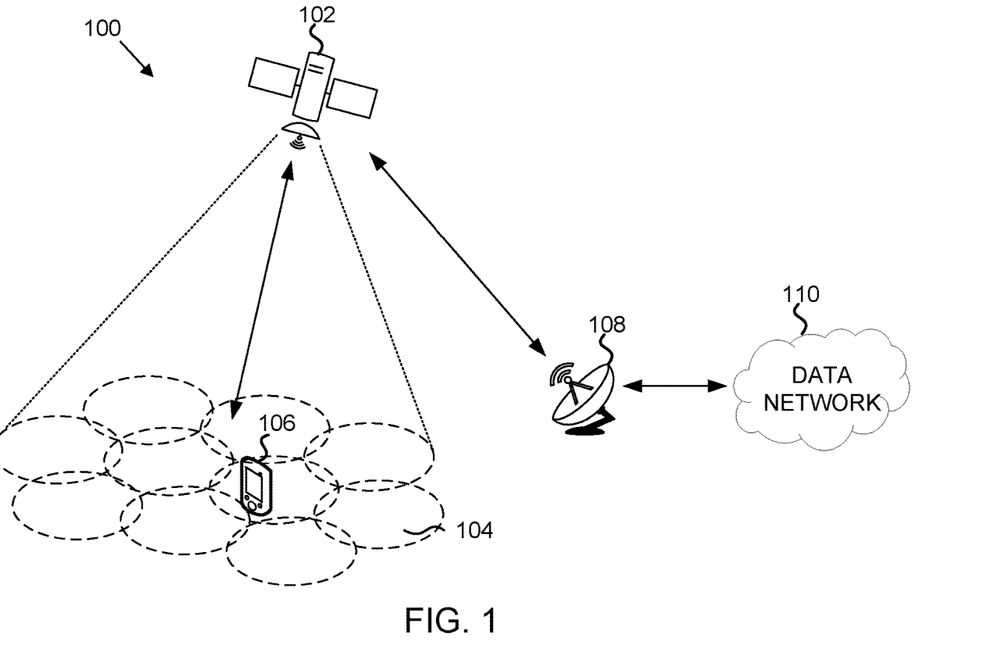
FIG. 1 illustrates an example of a non-terrestrial communication network according to an example embodiment.

FIG. 1 illustrates an example of a non-terrestrial communication network, according to an example embodiment. The non-terrestrial communication network 100 may comprise one or more UE 106. A service link may be provided between the UE 110 and a satellite 102, which may be further connected to a gateway 108 by a feeder link. The gateway 108 may be connected to a data network 110 to enable the UE 106 to access data services.

A satellite 120 may be located on a satellite orbit, for example, a low earth orbit (LEO), which may be located, for example, 500-1500 km above the earth. The satellite 120 may therefore comprise a LEO satellite. Other types of satellites may be however applied as well, including for example medium earth orbit satellites and High Altitude Platform Systems (HAPS). However, with LEO satellites the communication delay may be shorter and cost of a LEO satellite and its deployment may be lower compared to other type of satellites. A beam footprint 104 size of a LEO satellite may be, for example, between 50-1000 km in radius. One LEO satellite may therefore cover a very large area on the earth, including possibly multiple countries.

Figure 2A:
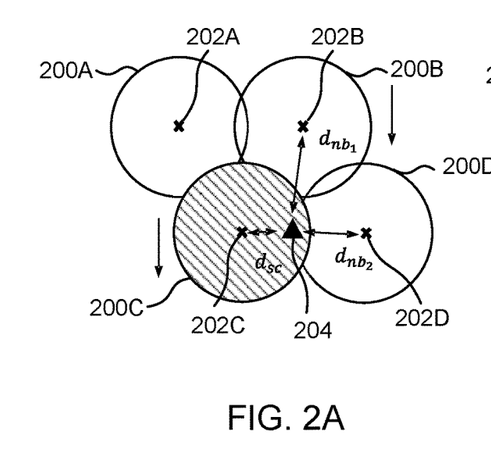
FIGS. 2A and 2B illustrate situations at two time instants ($t_1$ and $t_2$) with three moving neighboring cells and a service cell according to an example embodiment.
Figure 2B:
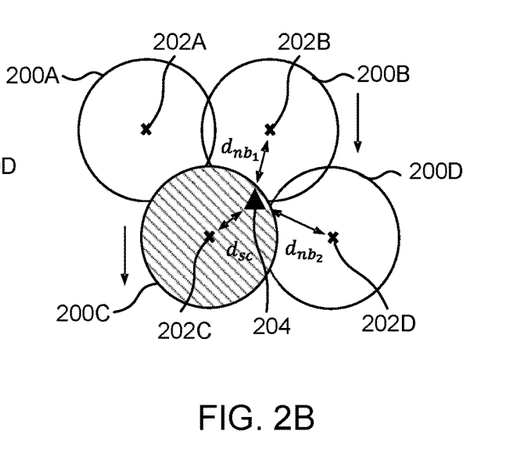

FIGS. 2A and 2B illustrate situations at two time instants, $t_1$ (FIG. 2A) and $t_2$ (FIG. 2B) with three moving neighboring cells 200A, 200B, 200D and a serving cell 200C of a UE 204. In FIGS. 2A and 2B the UE 204 remains stationary with respect to the earth, i.e. it does not move. It is noted that in some examples the UE 204 may move, but even if the UE 204 is moving, the speed of the movement may be very slow compared with the movement of the cells. Each cell 200A, 200B, 200C, 2000D has a corresponding cell center location 202A, 202B, 202C, 202D. In EMC-based NTN the mobility is mainly due to satellite movement as they move much faster than UEs on the ground. As the cells 200A, 200B, 200C, 200D and the UE 204 move in a particular direction, the UE 204 might fall into an edge of the serving cell 200C where radio link conditions will trigger the measurement-based event configured by the network, i.e. cell edge between the serving cell 204 and the neighboring cell 200D. However, due to the nature of EMCs, the UE 204 may need to immediately handover to the following cell, i.e. the neighbouring cell 200B, thus staying for a very short time in the neighboring cell 200D. Such situation is undesired as it implements an unnecessary handover. And, when an unnecessary handover is performed, there is always also a risk of a handover failure or a radio link failure.

The example embodiments of the present disclosure enable a solution in which such undesired handover events can be avoided by introducing additional location information within measurement report triggering which allows the UE to stay in the serving cell for a longer time and handing over to the appropriate next (neighboring) cell by considering the direction and relative location of the moving cells.

According to an example embodiment, an apparatus is provided. The apparatus may comprise, for example, a UE. The UE may obtain location information associated with at least one moving neighboring cell. The UE may determine, based on the location information, a distance change associated with the at least one moving neighboring cell. The UE may determine an offset the at least one moving neighboring cell based on the distance change associated with the at least one moving neighboring cell. The UE may also apply the offset associated with the at least one moving neighboring cell in a mobility event associated with the moving neighboring cell. The mobility event may comprise, for example, a handover triggering event or an idle mode reselection event. This may enable to avoid the UE attempting to connect to a neighbour cell that may cause an immediate new mobility event, such as a handover attempt, to another neighbour cell due to the fast movement of the cells. Instead, the solution may enable the UEs to stay in the serving cell for a longer time and handing over to the appropriate next cell by considering the direction and relative location of the moving cells.

It is noted that the offset may be understood, in some examples, as a value that is affected by at least movement of the respective moving neighboring cell (i.e. the cell for which the offset is computed/determined) with respect to UE (e.g. UE 204 or UE 106). In one example, the offset may be determined based on distance change between the respective moving neighboring cell and the UE. In one example, the offset may be determined based on distance change between the respective moving neighboring cell and the UE, and the distance change between serving cell and the UE. In one example, the value of the offset may be represented by decibels (dBs).

Figure 3:
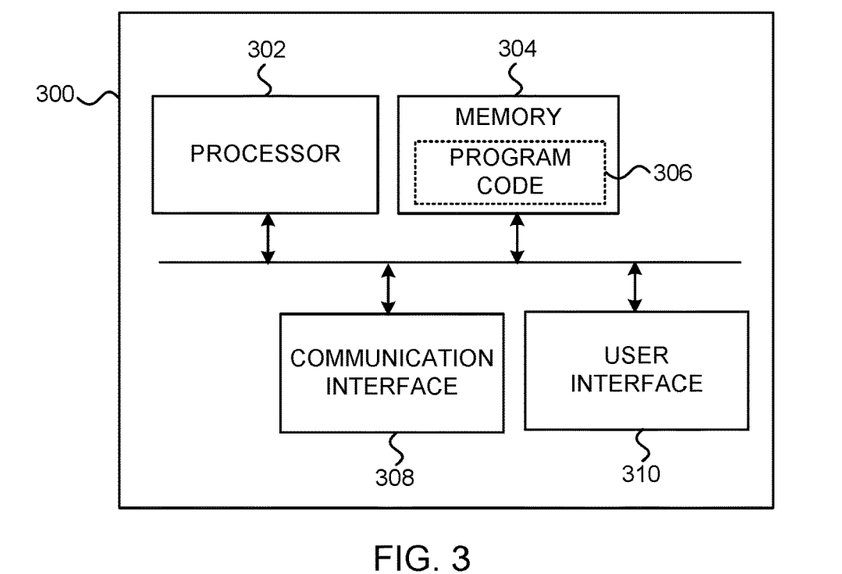
FIG. 3 illustrates an example of an apparatus configured to practice one or more example embodiments.

FIG. 3 illustrates an example embodiment of an apparatus 300, for example, the UE 106 or a component or a chipset of the UE 106, a satellite or a component or a chipset of the satellite 102, or a base station. The apparatus 300 may comprise at least one processor 302. The at least one processor 302 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 300 may further comprise at least one memory 304. The at least one memory 304 may be configured to store, for example, computer program code or the like, for example operating system software and application software. The at least one memory 304 may comprise one or more volatile memory devices, one or more non-volatile memory devices, and/or a combination thereof. For example, the at least one memory 304 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 300 may further comprise a communication interface 308 configured to enable apparatus 300 to transmit and/or receive information to/from other devices. In one example, apparatus 300 may use communication interface 308 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 308 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 300 may further comprise a user interface 310 comprising an input device and/or an output device. The input device may take various forms such a keyboard, a touch screen, or one or more embedded control buttons. The output device may for example comprise a display, a speaker, a vibration motor, or the like.

When the apparatus 300 is configured to implement some functionality, some component and/or components of the apparatus 300, for example, the at least one processor 302 and/or the at least one memory 304, may be configured to implement this functionality. Furthermore, when the at least one processor 302 is configured to implement some functionality, this functionality may be implemented using the program code 306 comprised, for example, in the at least one memory 304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUS).

The apparatus 300 may comprise means for performing at least one method described herein. In one example, the means may comprise the at least one processor 302, the at least one memory 304 including program code 306 configured to, when executed by the at least one processor, cause the apparatus 300 to perform the method.

The apparatus 300 may comprise, for example, a computing device such as for example, a server, a mobile phone, a tablet computer, a laptop, an internet of things (IOT) device, or the like. Examples of IoT devices include, but are not limited to, consumer electronics, wearables, sensors, and smart home appliances. In one example, the apparatus 300 may comprise a vehicle such as for example a car. Although apparatus 300 is illustrated as a single device it is appreciated that, wherever applicable, functions of the apparatus 300 may be distributed to a plurality of devices, for example, to implement example embodiments as a cloud computing service.

Figure 4A:
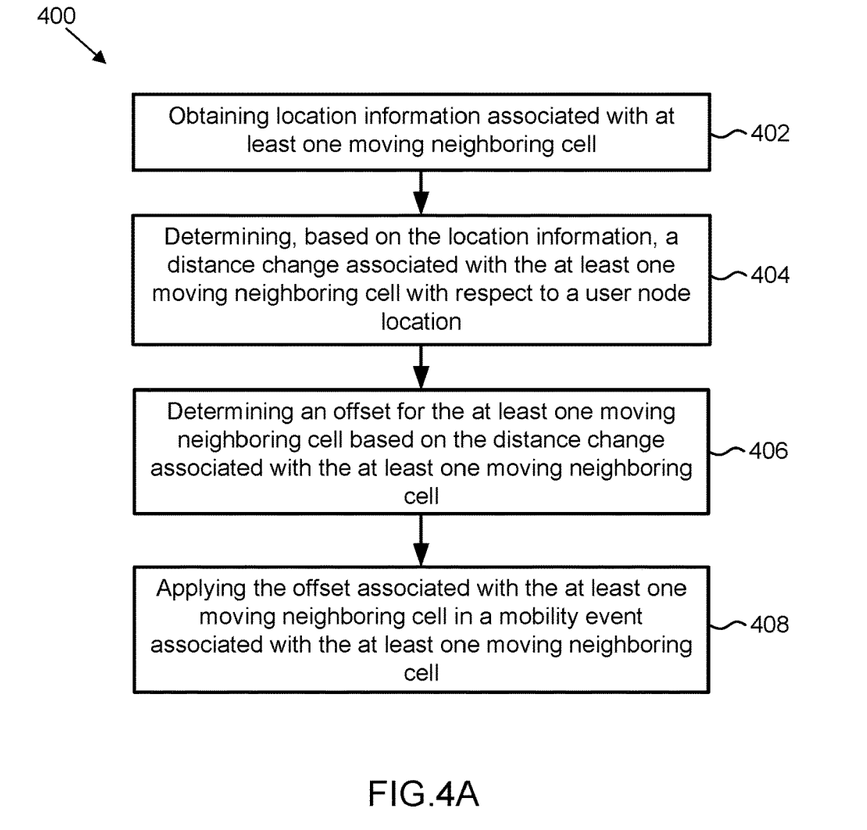
FIG. 4A illustrates an example of a method according to an example embodiment.

FIG. 4A illustrates an example of a method according to an example embodiment. The method may be implemented by the apparatus 300 illustrated in FIG. 3, for example, a UE.

At operation 402, location information associated with at least one moving neighboring cell may be obtained. In an example embodiment, the location information associated with a moving neighboring cell may refer to a center location of the moving neighboring cell. In some examples, this may be referred to as "cell center". Each cell center location may be given as a static value, a static value added with a movement vector, or a static value added with information on relation to satellite ephemeris, for example, the angle in azimuth and elevation towards the satellite providing the cell.

At operation 404, a distance change associated with the at least one moving neighboring cell with respect to a UE location may be determined based on the location information. The location information, for example, the cell center information may be used to calculate "UE location—cell center" distances $d_{nb1}(t)$, $d_{nb2}(t)$ . . . associated with the moving neighboring cells. The calculations may be made regularly. The network may define how frequent to update the distance estimates. In another example embodiment, the UE may determine the update interval.

Figure 5:
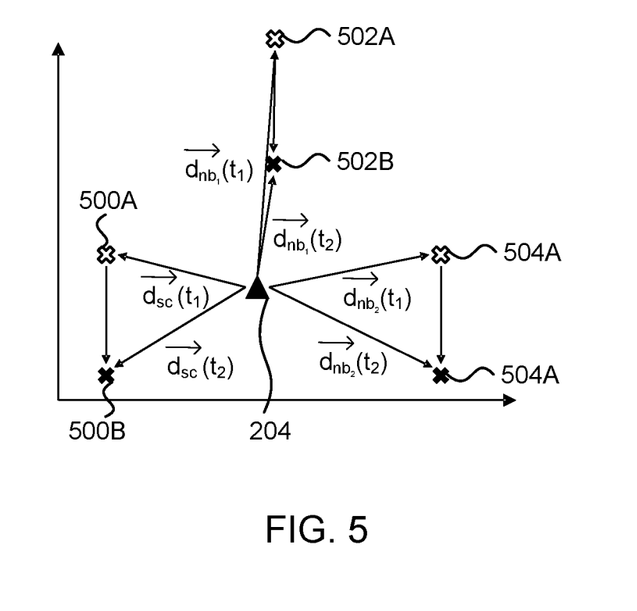
FIG. 5 illustrates center locations of moving neighboring cells at a first time instant $t_1$ and center locations of the moving neighboring cells at a second time instant $t_2$ with respect to the according to an example embodiment.

FIG. 5 illustrates center locations 500A, 502A, 504A at a first time instant $t_1$, and center locations 500B, 502B, 504B at a second time instant $t_2$ with respect to the UE 204. Based on the calculated distances at time instants $t_1$ and $t_2$, the UE 204 can calculate the distance change $\Delta d_{nb_i}(t_1, t_2)$, where $\Delta d_{nb_i}$ is the distance change for a moving neighboring cell i. The distance calculation procedure may be performed to some or for all relevant neighboring cells. In an example embodiment, the UE 204 may calculate also $\Delta d_{sc}(t_1, t_2)$, where $\Delta d_{sc}$ is the distance change for the serving cell.

At operation 406, an offset is determined for the least one moving neighboring cell based on the distance change associated with the at least one moving neighboring cell. The offset may be determined separately for each moving neighboring cell of the at least one moving neighboring cell.

At operation 408, the offset associated with the at least one moving neighboring cell is applied in a mobility event associated with the at least one moving neighboring cell. The mobility event may comprise, for example, a handover triggering event or an idle mode reselection event.

As an example, the conventional measurement triggers identified, for example, in 3GPP TS 38.331 V16.3.1 (2021-01) can be based on RSRP (Reference Signal Received Power) or RSRQ (Reference Signal Received Quality) may include one or more of the following briefly listed below:

Event A1 (Serving cell becomes better than threshold)
Event A2 (Serving cell becomes worse than threshold)
Event A3 (Neighboring cell becomes offset better than SpCell)
Event A4 (Neighboring cell becomes better than threshold)
Event A5 (SpCell becomes worse than threshold1 and neighboring cell becomes better than threshold2)
Event A6 (Neighboring cell becomes offset better than SpCell).

As an example, Event 3 can be written as follows:

$$Mn+Ofn+Ocn-Hys>Mp+Ofp+Ocp+\text{Off} \quad (1)$$

where
Mn=neighbour cell measurement (RSRP or RSRQ)
Mp=serving cell measurement (RSRP or RSRQ)
Hys=hysteresis
Ofn, Ofp=frequency dependent offsets for neighboring and serving cells
Ocn, Ocp=cell dependent offsets for neighboring and serving cells
Off=Offset
For simplicity, Ofn and Ofp may be assumed to be 0 dB.

Although Event 3 is used as an example herein, the disclosed solution can be applied also to other events.

With the solution disclosed above, the Equation (1) is modified to include the offset (identified here as "Offset2") determined at the operation 406:

$$Mn+Ofn+Ocn-Hys>Mp+Ofp+Ocp+Off+Offset2$$

By using the additional offset, i.e. Offset2, the movement of cells may be taken into account. This may also enable a reduction of mobility events where the UE is briefly connected to a cell, which is about to leave the area of the UE. An additional benefit may be that the risk of a radio link failure is reduced.

According to an example embodiment, the UE may obtain from the network a distance scaling factor α. The distance scaling factor may a common factor for two or more moving neighboring cells (for example, for all moving neighboring cells that are considered by the UE). In another example embodiment, the distance scaling factor may be moving neighboring cell specific. Further, the UE may also obtain location information associated with the serving cell and calculate also $\Delta d_{sc}(t_1, t_2)$, where $\Delta d_{sc}$ is the distance change for the serving cell between the time instants $t_1$ and $t_2$. The UE may then determine, for each moving neighboring cell, a difference $\Delta d_{sc} - \Delta d_{nb}$ between the distance change associated with the serving cell and the distance change associated with the moving neighboring cell, and determine the offset for the moving neighboring cell based on the difference $\Delta d_{sc} - \Delta d_{nb}$. In an example embodiment, the UE may then determine the offset, based on the following equation:

$$\alpha \cdot (\Delta d_{sc} - \Delta d_{nb}) / |\Delta d_{sc}| \quad (2)$$

The scaling factor may be given, for example, as a general value or per cell/frequency layer. In another example embodiment, the distance scaling factor (i.e. a) may be omitted from the Equation (2).

According to another example embodiment, the UE may obtain, for a moving neighboring cell (for example, for each moving neighboring cell considered by the UE), a distance scaling factor α associated with the moving neighboring cell, and scale the offset with the distance scaling factor associated with the moving neighboring cell. For example, if there are two neighboring cells, the Offset2 for the first cell may be computed by a. $\Delta d_{nb_1}$. Similarly, the Offset2 for the second cell may be computed by $\alpha \cdot \Delta d_{nb_2}$. In an example embodiment, the distance scaling factor α is not applied or it may be set to a value of "1". Thus, the distance scaling factor may be omitted, and the offset may be determined based on only the $\Delta d_{nb_1}$ or $\Delta d_{nb_2}$.

According to another example embodiment, the UE may obtain location information associated with the serving cell and determine, based on the location information associated with the serving cell, a distance change $\Delta d_{sc}$ associated with the serving cell. The UE may then determine the offset based on a ratio of the distance change $\Delta d_{nb}$ associated with the moving neighboring cell and the distance change $\Delta d_{sc}$ associated with the serving cell relative to the user node. For example, the Offset2 may be calculated by the following equation:

$$\Delta d_{nb} / |\Delta d_{sc}|$$

In an example embodiment, the offset associated with the respective moving neighboring cell scaled with the distance change $\Delta d_{sc}$ associated with the serving cell may be additionally scaled with the distance scaling factor α:

$$\alpha \cdot \Delta d_{nb} / |\Delta d_{sc}|$$

According to another example embodiment, the UE may obtain a mapping table associated with at least one moving neighboring cell, the mapping table associated with the at least one moving neighboring cell. The mapping table may comprise at least one association, each association defining an association between an offset and a distance change value. An example of such a distance change value may be distance change associated with a moving neighboring cell. In another example embodiment, each association may define an association between an offset and a function of the distance change $\Delta d_{nb}$ associated with the moving neighboring cell and the distance change $\Delta d_{sc}$ associated with the serving cell. In an example embodiment, the mapping table may comprise information pairs $\Delta d_{sc} - \Delta d_{nb} \leftrightarrow \text{Offset2}$ or $\Delta d_{nb} \leftrightarrow \text{Offset2}$, based on which the correct Offset2 to be applied can be selected. In an example embodiment, the Offset2 may be additionally scaled with the distance scaling factor α.

According to another example embodiment, the UE may determine that a moving neighboring cell is provided via a different satellite than the serving cell and apply an additional scaling factor β for the Offset2 when the moving neighboring cell of at least one moving neighboring cell is provided via a different satellite than the serving cell. Thus, the Offset2 may be calculated, according to one of the following equations:

$$\beta \cdot \alpha \cdot (\Delta d_{sc} - \Delta d_{nb}) / |\Delta d_{sc}|$$

$$\beta \cdot \alpha \cdot \Delta d_{nb}$$

$$\beta \cdot \alpha \cdot \Delta d_{nb} / |\Delta d_{sc}|$$

Alternatively, the UE may add an additional Offset3 to the Offset2, for example, according to one of the following equations:

$$\alpha \cdot (\Delta d_{sc} - \Delta d_{nb}) / |\Delta d_{sc}| + \text{offset3}$$

$$\alpha \cdot \Delta d_{nb} + \text{offset3}$$

$$\alpha \cdot \Delta d_{nb} / |\Delta d_{sc}| + \text{offset3}$$

According to an example embodiment, the UE may obtain or apply obtaining a minimum or a maximum threshold for the offset, and limit the offset based on the minimum or maximum threshold for the offset, when applying the offset in the mobility event. The minimum or maximum threshold may be used, for example, to avoid that a cell with very poor radio conditions is chosen because it moves fast towards the UE location.

Figure 4B:
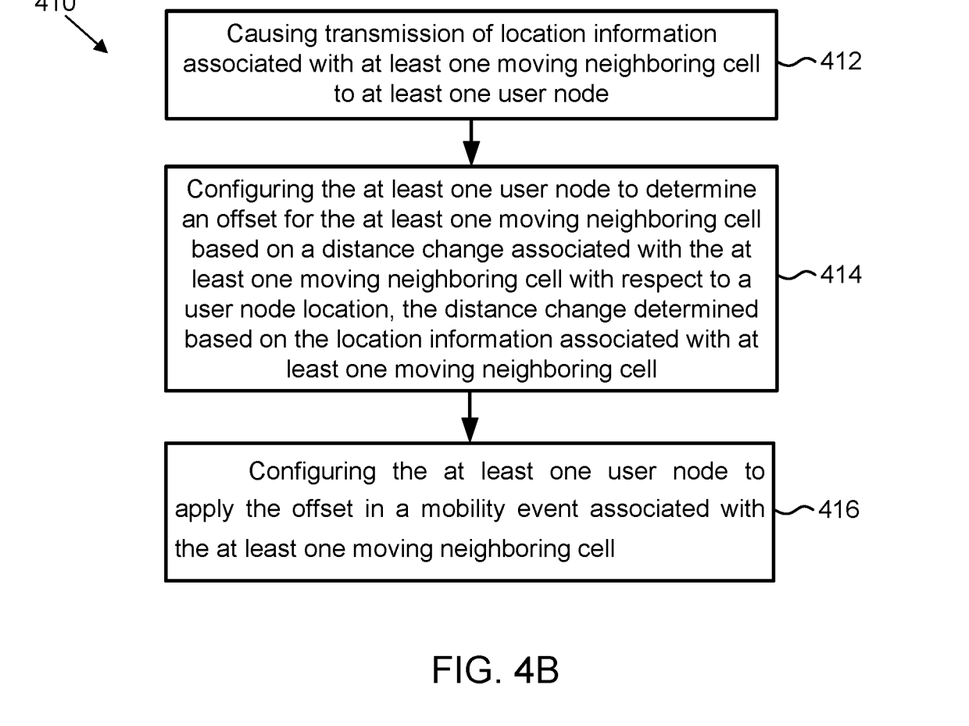
FIG. 4B illustrates an example of a method according to an example embodiment.

FIG. 4B illustrates an example of a method 410 according to an example embodiment. The method may be implemented by the apparatus 300 illustrated in FIG. 3, for example, a satellite or a base station.

At operation 412, transmission of location information associated with at least one moving neighboring cell is caused to at least one user node.

At operation 414, the at least one user node is configured to determine an offset for the at least one moving neighboring cell based on a distance change associated with the at least one moving neighboring cell with respect to a user node location, the distance change determined based on the location information associated with at least one moving neighboring cell.

At operation 416, the at least one user node is configured to apply the offset in a mobility event associated with the at least one moving neighboring cell.

In an example embodiment, a distance scaling factor associated with the at least one moving neighboring cell may be caused to be transmitted to the user node, the distance scaling factor being used by the user node to scale the offset.

In an example embodiment, a mapping table associated with the at least one moving neighboring cell may be caused to be transmitted to the user node, the mapping table associated with a moving neighboring cell comprising at least one association, each association defining an association between an offset and at least one distance change value, the mapping table enabling the user node to determine the offset for the at least one moving neighboring cell.

Figure 6:
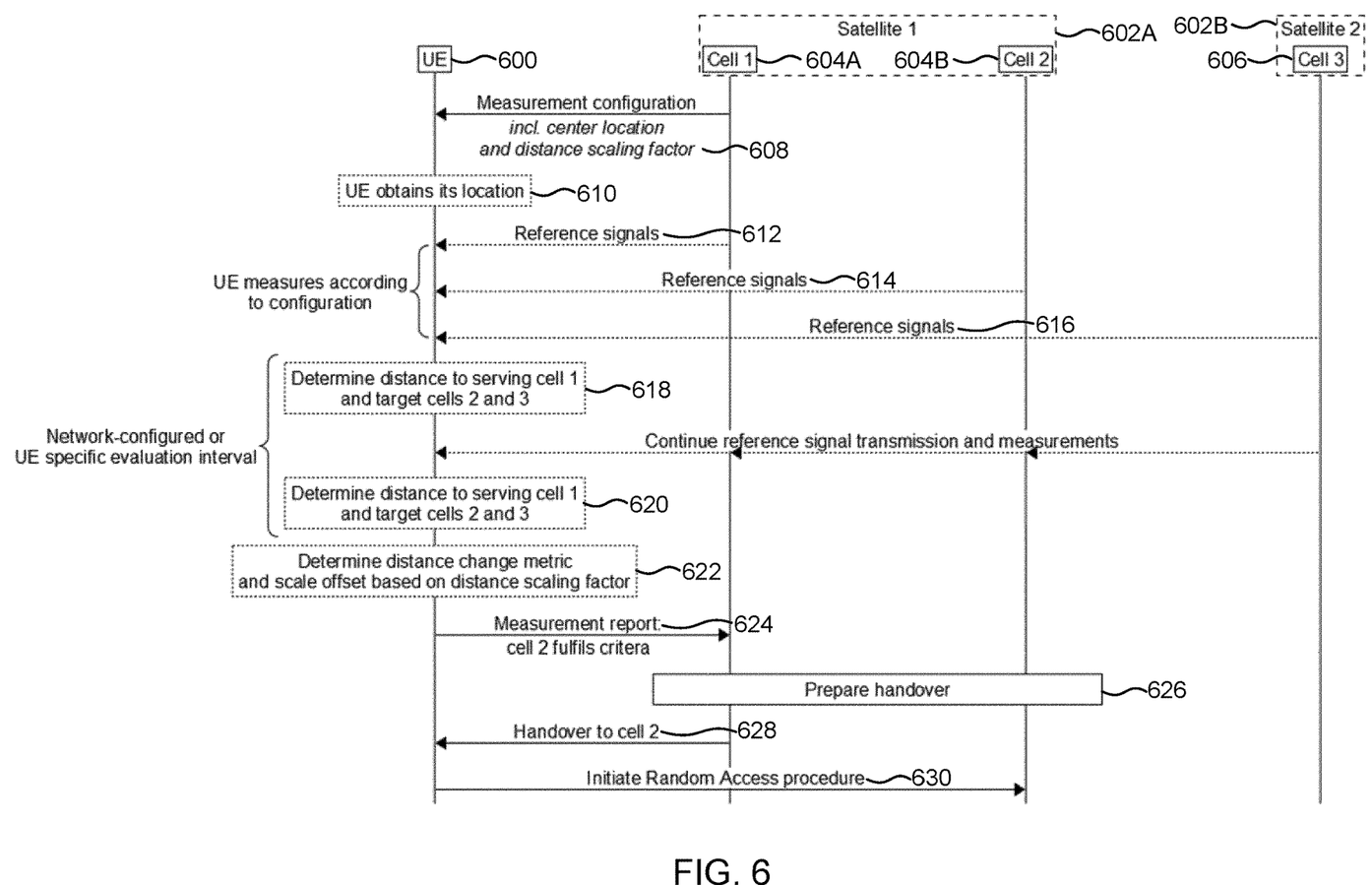
FIG. 6 illustrates an example of a signaling diagram according to an example embodiment.

FIG. 6 illustrates an example of a signaling diagram according to an example embodiment.

The arranged comprises a user equipment 600 that may be served by cells 604A, 604B provided by a first satellite 602A and by a cell 606 provided by a second satellite 602B.

The first satellite 602A may transmit to the UE 600 measurement configuration data 608. The measurement configuration data comprises, for example, cell center location data and distance scaling factors associated with the first cell 604A and the second cell 604B. At 610, the UE 600 may obtain its location, for example, by using satellite positioning data.

At 612, 614, 616, each of the cells 604A, 604B, 606 transmits reference signals to the UE 600, and the UE 600 measures these signals according to the measurement configuration data.

At 618 and 620 the UE 600 determines a distance to the first cell 604A (i.e. to the serving cell) and distances to the neighboring cells 604A, 606 (i.e. to target cells). The time interval between the steps 618 and 620 may be network configured or a UE specific evaluation interval.

At 622 the UE determines a distance change metric and a scale offset based on a distance scaling factor. The UE may obtain the distance scaling factor, for example, from the network.

As a results of determining the distance change metric, it follows that the second cell 604B fulfills predetermined criteria 624, and thus can be used as a cell into which a handover can be performed. At 626, the handover between the cells is prepared, and at 628 the first cell 604A instructs the UE 600 to perform the handover to the second cell 604B. In response to this, the UE 600 initiates a random access procedure 630 with the second cell 604B.

Further features of the methods directly result from the functionalities and parameters of the UE 104, the satellite 102, or in general the apparatus 300, as described in the appended claims and throughout the specification, and are therefore not repeated here. Different variations of the methods may be also applied, as described in connection with the various example embodiments.

An apparatus may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations as (such implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising at least one processor, and at least one memory including program code, the at least one processor, and program code configured to, when executed by the at least one processor, cause the apparatus to perform:
   obtaining location information associated with at least one moving neighboring cell;
   determining, based on the location information, a distance change associated with the at least one moving neighboring cell with respect to a user node location;
   determining an offset associated with the at least one moving neighboring cell based on the distance change associated with the at least one moving neighboring cell;
   applying the offset associated with the at least one moving neighboring cell in a mobility event associated with the at least one moving neighboring cell;
   obtaining a distance scaling factor associated with the at least one moving neighboring cell; and
   scaling the offset associated with the at least one moving neighboring cell with the distance scaling factor.

2. The apparatus according to claim 1, caused to perform:
   obtaining location information associated with a serving cell;
   determining, based on the location information associated with the serving cell, a distance change associated with the serving cell relative to the user node location; and
   determining the offset associated with the at least one moving neighboring cell based on the distance change associated with the at least one moving neighboring cell and the distance change associated with the serving cell relative to the user node location.

3. The apparatus according to claim 2, caused to perform:
   determining the offset associated with for the at least one moving neighboring cell based on a ratio between a difference between the distance change associated with the serving cell relative to the user node location and the distance change associated with the respective moving neighboring cell, and the distance change associated with the serving cell relative to the user node location.

4. The apparatus according to claim 2, caused to perform:
   determining the offset associated with the at least one moving neighboring cell based on a ratio of the distance change associated with the at least one moving neighboring cell and the distance change associated with the serving cell relative to the user node location.

5. The apparatus according to claim 1, caused to perform:
   obtaining a mapping table associated with the at least one moving neighboring cell, the mapping table comprising at least one association, each association defining an association between an offset and a distance change associated with a moving neighboring cell; and
   determining the offset associated with the at least one moving neighboring cell based on the mapping table.

6. The apparatus according to claim 1, caused to perform:
   obtaining location information associated with a serving cell;
   determining, based on the location information associated with the serving cell, a distance change associated with the serving cell relative to the user node location;
   obtaining a mapping table associated with the at least one moving neighboring cell, the mapping table comprising at least one association, each association defining an association between an offset and a function of the distance change associated with the moving neighboring cell and the distance change associated with the serving cell; and
   determining the offset associated with the at least one moving neighboring cell based on the mapping table.

7. The apparatus according to claim 1, wherein the at least one moving neighboring cell is provided by at least one satellite.

8. The apparatus according to claim 7, caused to perform:
   determining that a moving neighboring cell is provided via a different satellite than the serving cell; and
   applying an additional scaling factor for the offset when the moving neighboring cell is provided via a different satellite than the serving cell.

9. The apparatus according to claim 7, caused to perform:
   determining that a moving neighboring cell is provided via a different satellite than the serving cell; and
   adding an additional offset to the offset when the moving neighboring cell is provided via a different satellite than the serving cell.

10. The apparatus according to claim 1, caused to perform:
    obtaining a minimum threshold for the offset; and
    limiting the offset based on the minimum threshold for the offset, when applying the offset in the mobility event.

11. The apparatus according to claim 1, caused to perform:
    obtaining a maximum threshold for the offset; and
    limiting the offset based on the maximum threshold for the offset, when applying the offset in the mobility event.

12. The apparatus according to claim 1, wherein the location information associated with the at least one moving neighboring cell comprises a static cell center location value of the at least one moving neighboring cell, a static cell center location value of the at least one moving neighboring cell and a movement vector, or a static cell center location value of the at least one moving neighboring cell and information relating to a satellite ephemeris.

13. An apparatus, comprising at least one processor, and at least one memory including program code, the at least one processor, and program code configured to, when executed by the at least one processor, cause the apparatus to perform:
    causing transmission of location information associated with at least one moving neighboring cell to at least one user node;
    configuring the at least one user node to determine an offset associated with the at least one moving neighboring cell based on a distance change associated with the at least one moving neighboring cell with respect to a user node location, the distance change determined based on the location information associated with at least one moving neighboring cell; and
    configuring the at least one user node to apply the offset in a mobility event associated with the at least one moving neighboring cell; and
    causing transmission of a distance scaling factor associated with the at least one moving neighboring cell to the at least one user node, the distance scaling factor being used by the user node to scale the offset.

14. The apparatus according to claim 13, caused to perform:
    causing transmission of a mapping table associated with the at least one moving neighboring cell to the at least one user node, the mapping table associated with a moving neighboring cell comprising at least one association, each association defining an association between an offset and at least one distance change value, the mapping table enabling the user node to determine the offset associated with the at least one moving neighboring cell.

15. A method comprising:

obtaining location information associated with at least one moving neighboring cell;

determining, based on the location information, a distance change associated with the at least one moving neighboring cell with respect to a user node location;

determining an offset associated with the at least one moving neighboring cell based on the distance change associated with the at least one moving neighboring cell; and applying the offset associated with the at least one moving neighboring cell in a mobility event associated with the at least one moving neighboring cell;

obtaining a distance scaling factor associated with the at least one moving neighboring cell; and scaling the offset associated with the at least one moving neighboring cell with the distance scaling factor.

16. The method of claim 15, wherein the location information associated with the at least one moving neighboring cell comprises a static cell center location value of the at least one moving neighboring cell, a static cell center location value of the at least one moving neighboring cell and a movement vector, or a static cell center location value of the at least one moving neighboring cell and information relating to a satellite ephemeris.

* * * * *